US009473422B1

(12) United States Patent
Armistead, III

(10) Patent No.: US 9,473,422 B1
(45) Date of Patent: Oct. 18, 2016

(54) MULTI-STAGE SWITCHING TOPOLOGY

(71) Applicant: Google Inc., Mountain View, CA (US)

(72) Inventor: Robert Ashby Armistead, III, Los Altos, CA (US)

(73) Assignee: Google Inc., Mountain View, CA (US)

( * ) Notice: Subject to any disclaimer, the term of this patent is extended or adjusted under 35 U.S.C. 154(b) by 313 days.

(21) Appl. No.: 13/889,782

(22) Filed: May 8, 2013

Related U.S. Application Data

(60) Provisional application No. 61/644,795, filed on May 9, 2012.

(51) Int. Cl.
*H04L 12/56* (2006.01)
*H04L 12/933* (2013.01)

(52) U.S. Cl.
CPC .................................... *H04L 49/15* (2013.01)

(58) Field of Classification Search
CPC ....... H04L 12/28; H04L 12/46; H04L 12/56; H04L 49/25; H04L 49/3018; H04L 49/357; H04L 49/1507; H04L 49/351; H04L 49/15; H04L 49/3027; H04L 49/101; H04L 49/50; H04L 49/254; H04L 49/10; H04L 49/103; H04L 49/30; H04L 49/65; H04L 49/557; H04L 49/45; H04L 45/583; H04L 47/39
USPC ....... 370/386, 235, 389, 255, 388, 412, 413, 370/419; 257/499, 661, 930
See application file for complete search history.

(56) References Cited

U.S. PATENT DOCUMENTS

| | | | | |
|---|---|---|---|---|
| 6,504,841 B1* | 1/2003 | Larson | ................ | H04L 49/1515 370/386 |
| 6,643,702 B1* | 11/2003 | Yeung | ................ | G06F 13/4022 370/230 |
| 2002/0159449 A1* | 10/2002 | Carson | ................ | G06T 7/20 370/389 |
| 2010/0061242 A1* | 3/2010 | Sindhu | ................ | H04L 41/0806 370/235 |
| 2012/0072602 A1* | 3/2012 | Marr | ................ | H04L 12/4625 709/228 |
| 2012/0189004 A1* | 7/2012 | Hendel | ................ | H04L 49/15 370/360 |
| 2012/0250679 A1* | 10/2012 | Judge | ................ | H04L 49/351 370/359 |
| 2013/0083701 A1* | 4/2013 | Tomic | ................ | H04L 12/462 370/255 |
| 2013/0083793 A1* | 4/2013 | Lea | ................ | H04L 49/1515 370/388 |

* cited by examiner

*Primary Examiner* — Andrew Chriss
*Assistant Examiner* — Rasha Fayed
(74) *Attorney, Agent, or Firm* — McDermott Will & Emery

(57) ABSTRACT

A multi-stage switching fabric provides a plurality switching boxes. Each switching box includes a plurality of switches and a plurality of interconnects, and each interconnect is coupled to each switch. The switching boxes may be arranged in a first stage and a second stage. In this example, each switching box in the first stage may be coupled to each switching box in the second stage via a single high capacity cable. In this regard, each switch in the first stage may be coupled to each switch in the second stage using a reduced amount of cabling.

23 Claims, 6 Drawing Sheets

MULTI-STAGE SWITCHING TOPOLOGY

CROSS-REFERENCE TO RELATED APPLICATIONS

The present application claims the benefit of the filing date of U.S. Provisional Patent Application No. 61/644,795 filed May 9, 2012, the disclosure of which is hereby incorporated herein by reference.

BACKGROUND

Networks, such as data center networking fabrics, may become complex and costly as a capacity of the network grows. For example, using a folded Clos or fat tree topology, one can scale up networking capacity by adding more networking tiers or using switch elements of greater radix (e.g., having a greater number of ports).

FIG. 1 illustrates an example of a fat tree network, including switches 112-118 in a first stage and switches 122-128 in a second stage. One or more of the second stage switches 122-128 may further be connected to a spine 130, thereby providing connectivity between the switches 112, 114, 122, 124 and the switches 116, 118, 126, 128. The scale of the network depends on the radix of the switches 112-118, 122-128, and number of tiers of switches.

SUMMARY

One aspect of the disclosure provides a network, comprising a first stage comprising a first plurality of switching boxes, and a second stage comprising a second plurality of switching boxes, wherein each switching box in the first stage is coupled to at least one switching box in the second stage. Each switching box of the first plurality of switching boxes and second plurality of switching boxes includes two or more switches and two or more interconnects, each interconnect having a plurality of connections. Each of the two or more interconnects may be coupled to each of the two or more switches via the plurality of connections, wherein the connections of a first of the two or more interconnects establish a first pattern and the connections of a second of the two or more interconnects establish a second pattern. In one example, a first one of the first plurality of switching boxes may be coupled to a first one of the second plurality of switching boxes via one cable, and a second one of the first plurality of switching boxes is coupled to a second one of the second plurality of switching boxes via one cable. According to a further example, the interconnects in each of the first plurality of switching boxes and in each of the second plurality of switching boxes may include a left interconnect and a right interconnect, the left interconnect having the first pattern and the right interconnect having the second pattern. The left interconnect of a first one of the first plurality of switching boxes may be coupled to the right interconnect of a first one of the second plurality of switching boxes, and the right interconnect of a second one of the first plurality of switching boxes may be coupled to the left interconnect of a second one of the second plurality of switching boxes.

Another aspect of the disclosure provides a switching box, comprising two or more switches, and two or more interconnects. Each interconnect may have a plurality of connections, wherein each of the two or more interconnects is coupled to each of the two or more switches via the plurality of connections. Moreover, the connections of a first of the two or more interconnects establish a first pattern and the connections of a second of the two or more interconnects establish a second pattern. For example, the first pattern may be [0, 0, 1, 1] and the second pattern may be [0, 1, 0, 1], wherein a first of the two or more switches corresponds to connection "0" and a second of the two or more switches corresponds to connection "1".

Yet another aspect of the disclosure provides a network, comprising a first stage comprising a first plurality of switching boxes and a second stage comprising a second plurality of switching boxes, wherein each switching box in the first stage is coupled to each switching box in the second stage. Each switching box of the first plurality of switching boxes and the second plurality of switching boxes may include two switches and two interconnects, each interconnect having at least four connections 10GE capable connections. Each interconnect in a given switching box may be coupled to each switch in that switching box via the at least four connections, wherein the connections of a first interconnect establish a first pattern and the connections of a second interconnect establish a second pattern. The first interconnect of a first one of the first plurality of switching boxes may be coupled to the second interconnect of a first one of the second plurality of switching boxes via a 40GE cable, and the second interconnect of a second one of the first plurality of switching boxes may be coupled to the first interconnect of a second one of the second plurality of switching boxes via a 40GE cable.

DETAILED DESCRIPTION

Figure 1:
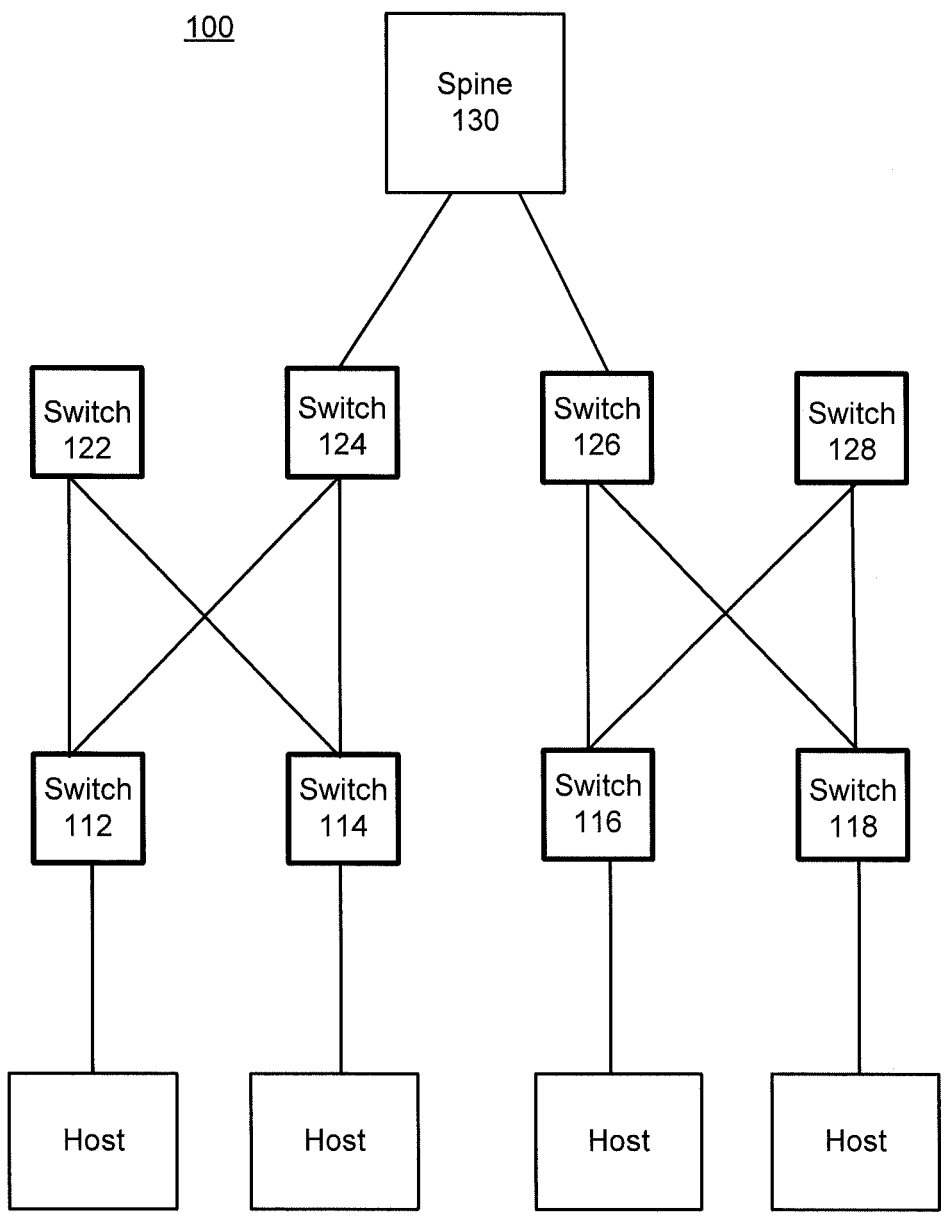
FIG. 1 illustrates a network configuration according to the prior art.

The present technology provides a switching topology including a multi-stage arrangement of switching boxes. This topology enables flows to be transmitted through a network quickly and using less cabling than a conventional network arrangement. Each switching box includes a plurality of switches and a plurality of interconnects, and each of the plurality of interconnects is coupled to each of the plurality of switches via intra-box links. The multi-stage arrangement may comprise a first plurality of the switching boxes in a first stage and a second plurality of the switching boxes in a second stage. The switching boxes in the first stage may be coupled to the switching boxes in the second stage via a reduced amount of cabling as compared to the example of FIG. 1. Further, packets may be distributed among some or all of the switches within boxes of a given stage using the intra-box links. This topology may be used in various networks, such as data centers, wide area networks (WANs), local area networks (LANs), microprocessors, and chips.

FIG. 2 illustrates a switch box 200 according to an aspect of the technology. The box 200 may include a plurality of switches 212, 214, such as routers, Ethernet switching chips (ESCs), or the like. For example, the box 100 may comprise a printed circuit board having switching chips thereon. In an alternative example, the box 200 may comprise a chassis housing the switches 212, 214 (e.g., housing routers, housing multiple circuit boards having the switches 212, 214 thereon, etc.) In the example of FIG. 2, two switches 212, 214 are included in the box 200. However, it should be understood that additional switches may also be included.

The switches 212, 214 may include any device capable of switching packets from one port to another. The switches 212, 214 may each include a processor and a memory. The memory may include a forwarding table, and the processor may communicate with the memory to determine how received packets should be routed. The switches 212, 214 may be conventional switching chips. The switches 212, 214, for example and without limitation, may be silicon chips specially designed for the box 200. For example, the switches 212, 214 may be designed to include a specified number of ports or to operate within predefined constraints, such as being 640 Gbps (64×10GE) capable.

The box 200 may also include interconnects 232, 234, coupled to the switches 212, 214. The interconnects 232, 234 may be any device used for coupling a link to the box 200, such as, for example and without limitation, a wire, a cable, a bundle of links, traces on a PCB, or other similar structure. For example, the interconnects 232, 234 may be Quad Small Form-factor Pluggable (QSFP) interconnects, enhanced small form-factor pluggable (SPF+) interconnects, wave division multiplexing (WDM) interconnects, copper (e.g., CXP) interconnects, or any other type of interconnects. According to one aspect, the interconnects 232, 234 may be multi-lane high-density transceivers, such as 16×40GE capable QSFP interconnects. As shown, each interconnect 232, 234 may provide a link (e.g., intra-box links 242, 244, 246, 248) to each switch 212, 214.

Using the example where two switches 212, 214 are each 64×10GE capable and two interconnects 232, 234 are each 16×QSFP (40GE) interconnects, the box 200 may be a 32×QSFP 128×10GE capable box. According to some aspects, the box 200 may be coupled to other devices, including, for example, host devices, other boxes similar to box 200, switches, spines, and other network devices. In some aspects, cabling (e.g., wires, links, traces, etc.) used to couple the box 200 to such devices may be 40GE capable. As such, fewer cables may be required, for example, as compared to if 10GE cables were used.

Figure 2A:
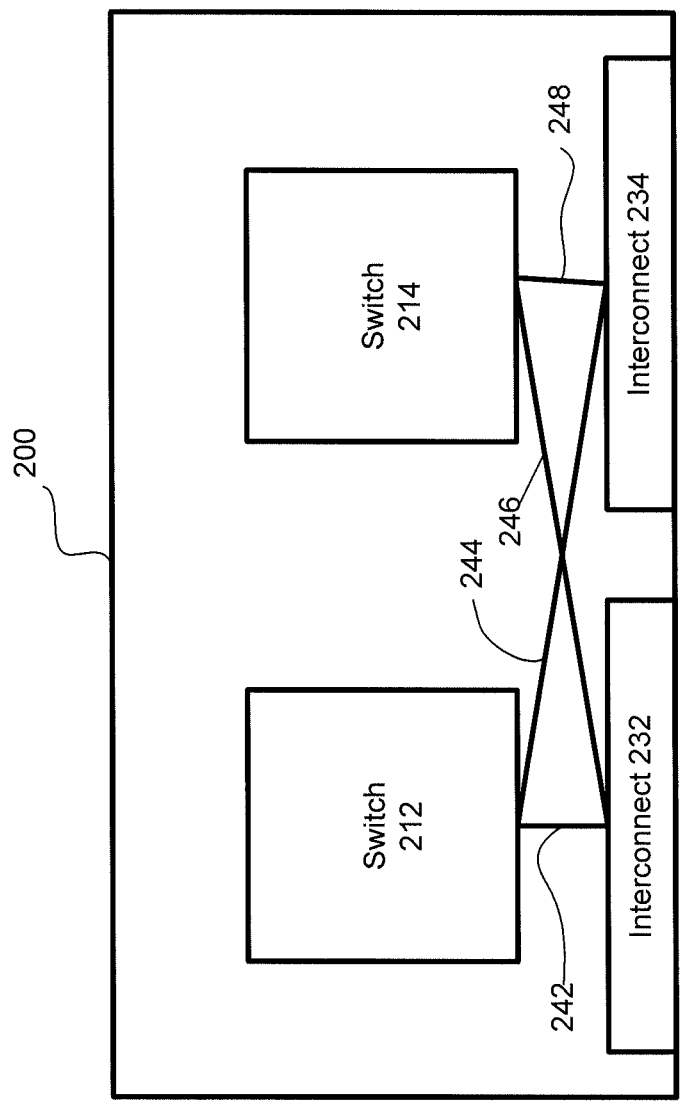
FIG. 2A illustrates an example of a switching box according to an aspect of the technology.
Figure 2B:
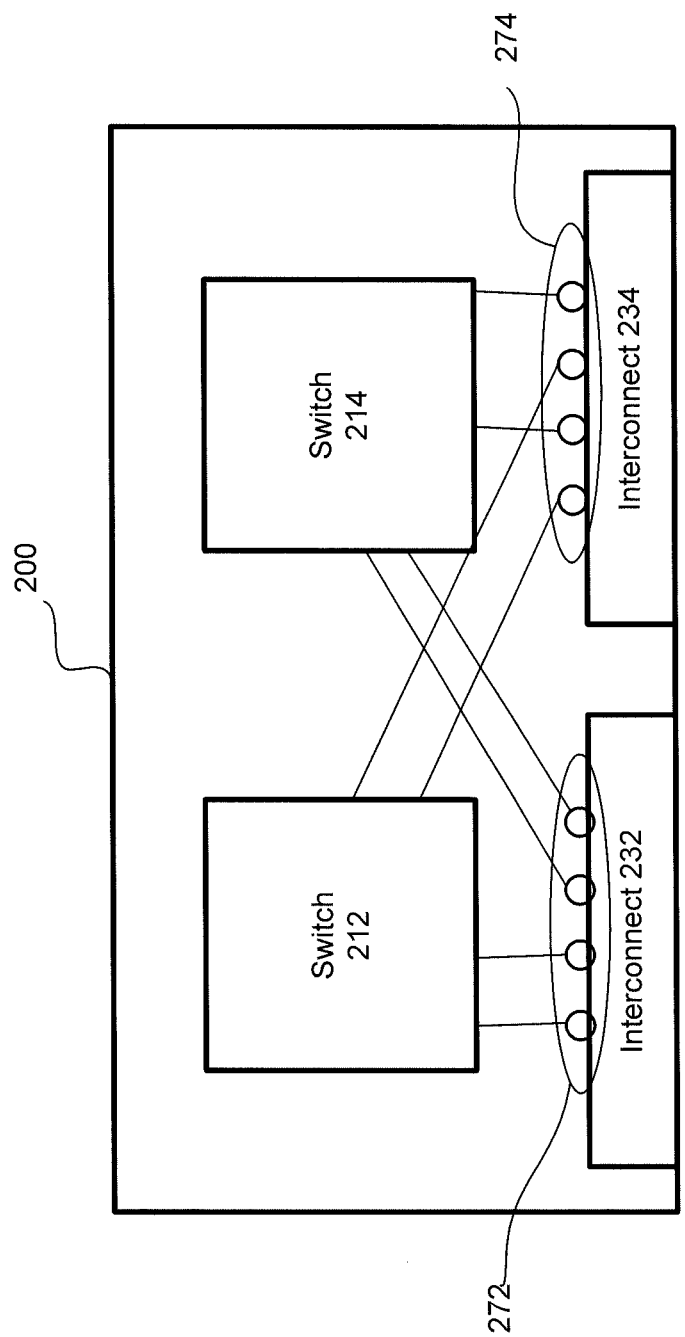
FIG. 2B illustrates an example of a connection pattern within the switching box of FIG. 2A.

As shown in FIG. 2B, each interconnect 232, 234 may include a number of connections 272, 274, such as ports or pins or lanes, which may be used to couple the interconnects 232, 234 to the switches 212, 214 or to other devices. For example, each interconnect 232, 234 may include four connections. According to one example, each of the connections 272, 274 may be coupled to the switches 212, 214 in the box 200. According to another example, some of the connections may be coupled to the switches 212, 214 in the box 200, while others are coupled to external devices (e.g., host devices, other boxes arranged in a network, etc.). According to one aspect, each of these connections 272, 274 may be 10G capable.

According to one example, the interconnects 232, 234 may differ from one another with respect to how their connections 272, 274 are dedicated. For example, a pinout of the first interconnect 232 may be [0, 0, 1, 1] while a pinout of the second interconnect 234 may be [0, 1, 0, 1]. Thus, where the switch 212 corresponds to "0" and the switch 214 corresponds to "1," the interconnects 232, 234 may still be fully connected to each switch 212, 214, but in a different wiring pattern. For example, the first two connections of the interconnect 232 may be coupled to the switch 212, while the second two connections of the interconnect are connected to the switch 214. Continuing this example with respect to the interconnect 234, the first and third connections of the interconnect 234 may be coupled to the switch 212, while the second and fourth connections are coupled to the switch 214. This pinout pattern may provide full connectivity to the switches 212, 214, such that identical boxes 200 and pinout patterns may be used at each stage of the network. Moreover, this configuration enables a reduced amount of cabling to be used to interconnect the network.

While specific examples of wiring patterns for the first interconnect 232 and second interconnect 234 are set forth above, a variety of wiring patterns may be used while still achieving full connectivity. For simplicity, the same pattern may be used for the interconnects in each box in the network. However, it is possible to vary the wiring patterns of the interconnects from box to box.

Figure 3:
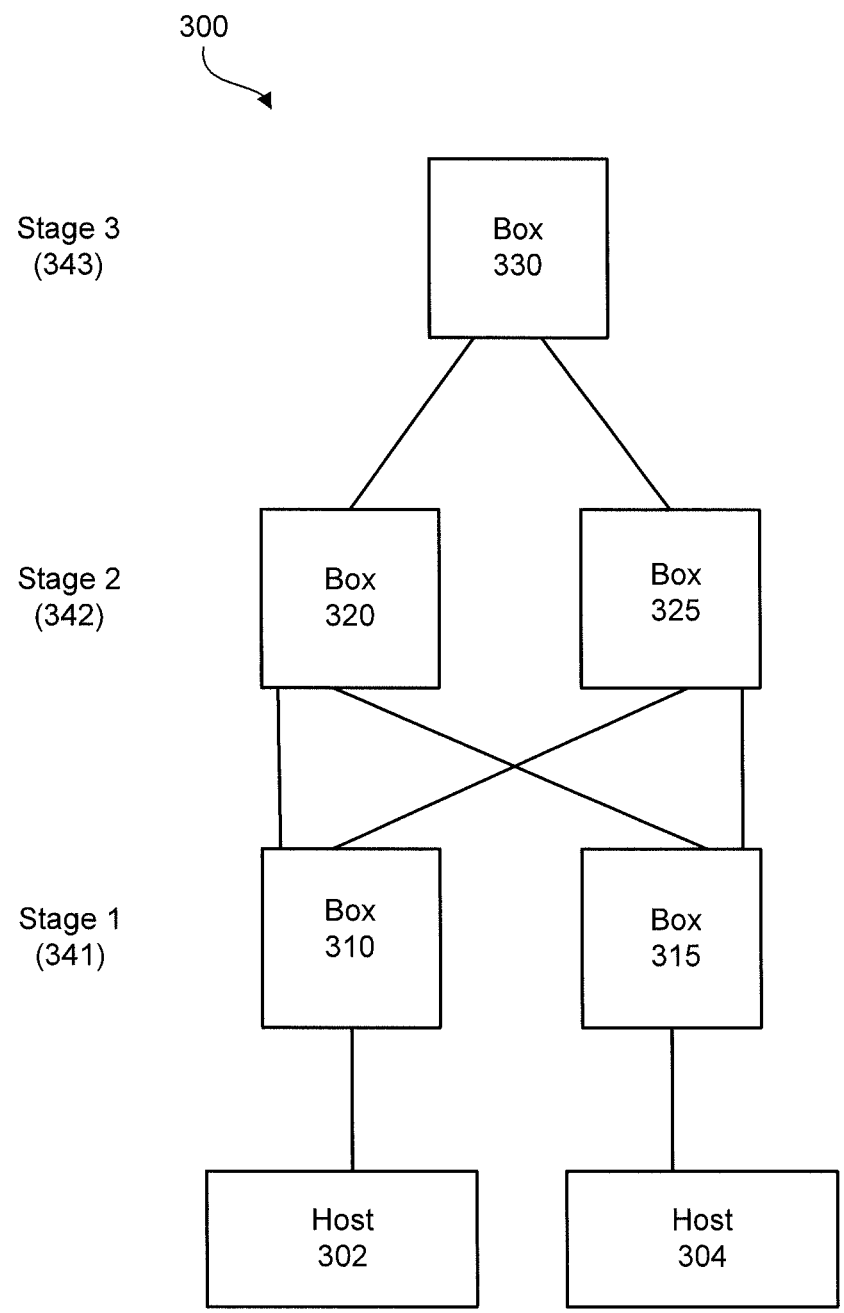
FIG. 3 illustrates an example of a network configuration according to an aspect of the technology.

FIG. 3 illustrates an example of a multi-stage network 300 including boxes configured similarly to the box 200 of FIG. 2A. The network 300 may be any type of network, such as a data center networking fabric, a local area network (LAN), a wide area network (WAN), or any other configuration of coupled switches. According to one example, the network 300 may be a switching chip having switches arranged therein. While the network 300 of FIG. 3 is shown as having three stages 341, 342, 343, it should be understood that any number of stages may be used.

As shown in FIG. 3, a first stage 341 of the network 300 may include a first number of boxes 310, 315. Each of boxes 310, 315 may include two or more switches having interconnects coupled thereto (e.g., similar to the box 200 of FIG. 2A). The first stage boxes 310, 315 may be coupled to a plurality of host devices 302, 304. The host devices 302, 304 may include servers, client devices, networking components, or any other type of computing device.

The second stage 342 of FIG. 3 may include a second number of boxes 320, 325. The boxes 320, 325 may be the same as or different than the first stage boxes 310, 315. The second stage boxes 320, 325 may also be configured similarly to the box 200 of FIG. 2A, although different boxes (e.g., having more switches therein) may also be used. For example, the first stage 341 may include numerous boxes, while the second stage 342 may include fewer boxes, each having a greater capacity (e.g., for transmitting data flows without becoming oversubscribed) than the first stage boxes.

The third stage 343 may also include one or more boxes 330 coupled to the boxes 320, 325 of the second stage 342. The third stage box 330 may be configured similarly to the box 200 of FIG. 2A. In some aspects box 330 may have a greater capacity (e.g., more switches, more interconnects, higher capacity switches, etc.) than the boxes on the first or second stage. According to one example, the third stage may include a high capacity switching device, such as a spine. The number of boxes 330 or other switching devices in the third stage 343 may vary, for example, depending on a number of boxes in the second and/or first stages. For example, for a non-blocking network, one box 330 may be used in the third stage 343 for every two boxes in the second stage 342 and two boxes in the first stage 341. Accordingly, if the second stage 342 is expanded to include eight boxes, the third stage 343 may include four boxes. While other ratios of boxes in each stage are possible in an expanded network, this may result in oversubscription.

Figure 4:
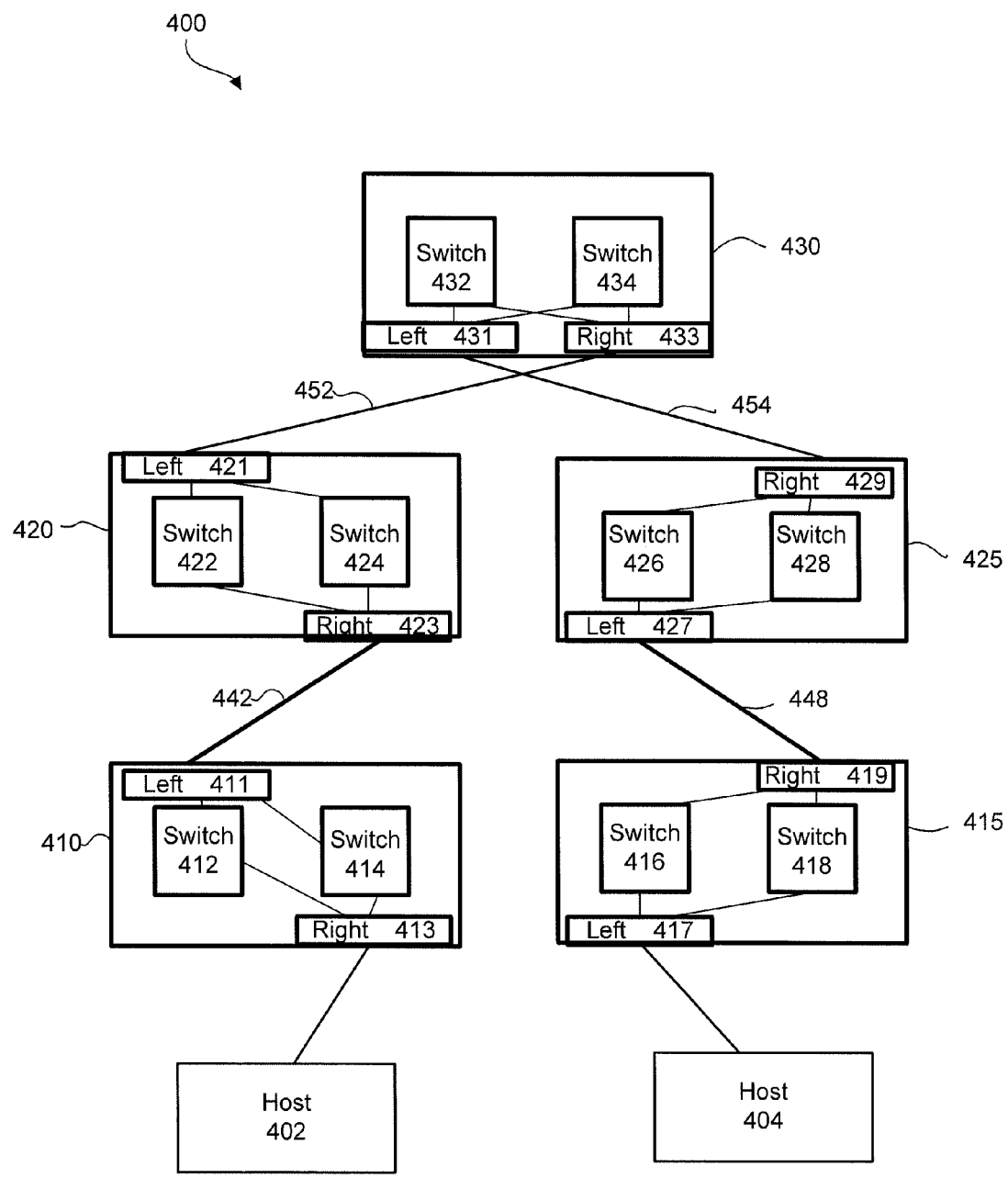
FIG. 4 illustrates another example of a network configuration according to an aspect of the technology.

FIG. 4 illustrates an example of interconnection of devices in a multi-stage network 400. As shown, the network 400 includes a plurality of boxes 410, 415, 420, 425, 430 coupled in a hierarchical arrangement. The boxes 410, 415 at a lowest stage of the hierarchy may be coupled to other network devices, such as hosts 402, 404. The boxes 410-430 may include the same components as the box 200 of FIG. 2A in the same configuration. For example, each box 410-430 may include two switches and two interconnects, where each interconnect is coupled to each switch in the same box. Moreover, the two interconnects within the boxes 410-430 may differ from one another. For example, each box 410-430 may include a first or "left" interconnect having a pinout of [0, 0, 1, 1] and a second or "right" interconnect having a pinout of [0, 1, 0, 1].

As shown in FIG. 4, the host 402 may be coupled to the box 410, while the host 404 may be coupled to the box 415. For example, the host 402 may be connected to any interconnect of the boxes. In the example shown in FIG. 4, the host 402 is connected to "right" interconnect 413 of the box 410, and the host 404 is connected to "left" interconnect 417 of the box 415. However, it should be understood that any other configuration for coupling the hosts 402, 404 to the first stage boxes 410, 415 may be appropriate. Because the interconnect 413 is coupled to each switch 412, 414 in the box 410 (e.g., via intra-box links), the host 402 may also be coupled to each switch 412, 414 through the host's coupling to the interconnect 413. Similarly, because the interconnect 417 may be connected to each of switches 416, 418 in the box 415, the host 404 may also be coupled to both switches 416, 418 through the interconnect 417.

The hosts of network 400 may also have various configurations. For example, while only two hosts 402, 404 and two first stage boxes 410, 415 are shown, the first stage of the network 400 may be expanded to include additional boxes, for example, to accommodate additional hosts. In this regard, the additional hosts may be coupled to interconnects of the additional boxes in a same pattern as the hosts 402, 404 and interconnects 413, 417 (e.g., right, left, right, etc.) or in any other configuration. According to some aspects, the host devices 402, 404 may actually comprise multiple hosts. In this regard, an additional device of multiple host 402 may be coupled to interconnect 411 of the box 410, and an additional device of multiple host 404 may be coupled to interconnect 419 of the box 415.

The boxes 410, 415 of the first stage may further be coupled to boxes 420, 425 of a second stage, for example, via inter-stage cables 442, 448. For example, "left" interconnect 411 of the box 410 may be coupled to "right" interconnect 423 of the box 420 via the cable 442. Further, "right" interconnect 419 of the box 415 may be coupled to "left" interconnect 427 of the box 425 via the cable 448. In this regard, each first stage box 410, 415 may be coupled to each second stage box 420, 425 through the inter-stage cables 442, 448. Moreover, each first stage switch 412, 414, 416, 418 may be coupled to each second stage switch 422, 424, 426, 428 through the interconnects.

Coupling the first and second stage boxes 410, 415, 420, 425 in this regard may provide full connectivity between the switches in the first and second stages. For example, because the left and right interconnects on each box have different pinouts, connecting the left interconnect 411 from one stage to the right interconnect 423 of another stage may result in coupling each of the switches 412, 414, 422, 424 in a way that provides uniform capacity to each of the switches 412, 414, 422, 424. In contrast, if the left interconnect 411 from the first stage were connected to the left interconnect 421 of the second stage, the result may be that switches 412 and 422 connect via two links while 412 does not connect to 424. By having different pinout, a full mesh of connectivity is provided between these two networking stages.

The boxes 420, 425 of the second stage may be coupled to the box 430 of a third stage, for example, via inter-stage cables 452, 454. For example, the left interconnect 421 of the box 420 may be coupled to a "right" interconnect 433 of the box 430 via the cable 452. The "right" interconnect 429 of the box 425 may be coupled to a "left" interconnect 431 of the box 430 via the cable 454. According to some aspects, the third stage may comprise a high capacity switching device, such as a spine, as opposed to the box 430. In this instance, the interconnects 421, 429 of the boxes 420, 425 may be coupled in any configuration to the spine.

As mentioned above with respect to FIGS. 2A-B, each of the interconnects may be 40GE capable. The inter-stage cables 442, 448, 452-454 may be bundles of links, WDM wavelength division multiplexed, short-reach multimode fibers, direct attached copper, or any other type of cabling or interconnect (e.g., cabling and transceiver). Moreover, according to one aspect, the network 400 may be multiplexed on a PCB to use any type of interconnect based on reach requirements.

Arranging the network 400 as described in FIG. 4 enables flows to be transmitted through the network 400 quickly and using less cabling than a conventional network arrangement. For example, a source for a data packet may be the host 402 and a destination may be the host 404. In this regard, the data packet may be transmitted to the switching box 410, and further transmitted to one or more of the second stage switching boxes 420, 425 (e.g., via cables 442 and/or 444). The data packet may then be transmitted to the switching box 415 (e.g., via cable 448) and further to the destination host 404. In the event of transmitting multiple data packets, the switching box 410 may distribute the data packets between the switch 412 and the switch 414 via the intra-box links (e.g., the intra-box links 242, 244, 246, 248 of FIG. 2A). Moreover, the packets may be distributed among some or all of the second stage switches 422, 424, 426, 428 using the inter-stage cables 442-448 and intra-box links in the boxes 420, 425.

While the examples shown in FIGS. 3 and 4 depict first tiers including only two boxes, more or fewer boxes may be included in the first tier. For example, more boxes may be added to accommodate a greater number of host devices. The number of boxes in the second tier may also be the same or different than the number of boxes in the first tier. Similar to the first tier, the second tier may be expanded to include a greater number of boxes. Moreover, while each box 410-430 of FIG. 4 is shown as including two switches, additional switches may be included in each box (e.g., using additional or higher capacity interconnects).

Figure 5:
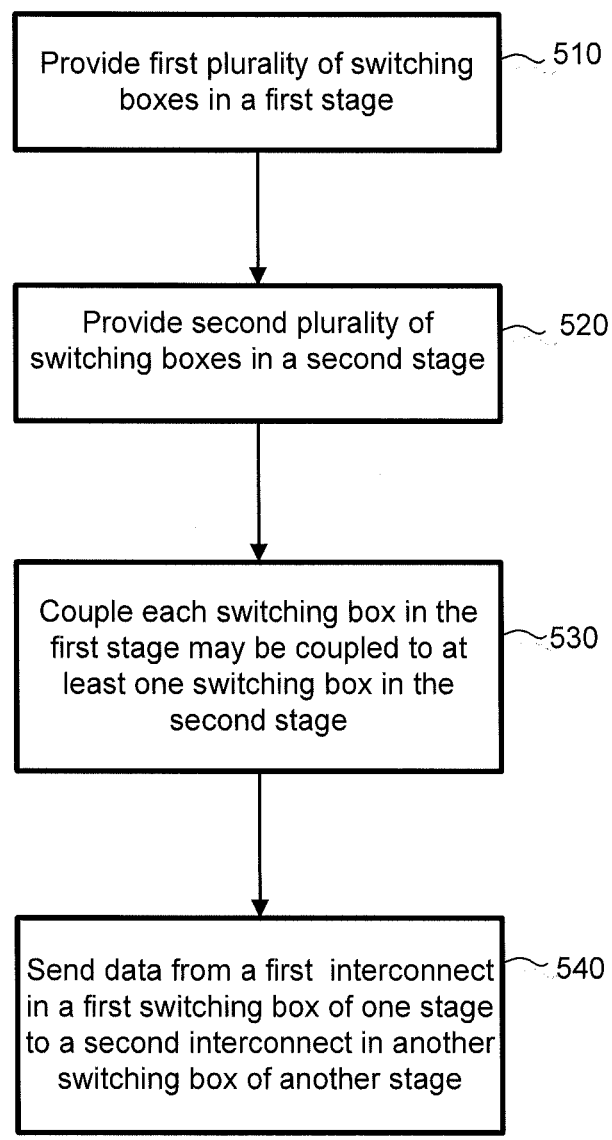
FIG. 5 is a flow diagram illustrating a method according to aspects of the technology.

FIG. 5 illustrates a method 500 of transmitting data through a network. While the description below refers to a number of blocks of the method 500 in a particular order, it should be understood that the order in which the blocks are performed may be modified, and blocks may be added or omitted.

In block 510, a first plurality of switching boxes is provided in a first stage of the network. In block 520, a second plurality of switching boxes is provided in a second stage of the network. Each switching box of the first plurality of switching boxes and second plurality of switching boxes may include two or more switches and two or more interconnects. Each interconnect may have a plurality of connections, wherein each of the two or more interconnects is coupled to each of the two or more switches via the plurality of connections. Further, the connections of a first of the two or more interconnects may establish a first pattern and the connections of a second of the two or more interconnects may establish a second pattern.

In block 530, each switching box in the first stage may be coupled to at least one switching box in the second stage. For example, inter-stage cabling may be used to couple an interconnect of a switching box in the first stage to an interconnect of a switching box in the second stage. In some examples, the first interconnect of each switching box may be a "left" interconnect, and the second interconnect may be a "right" interconnect. The left interconnect of a switching box in one stage may be coupled to the right interconnect of a switching box in another stage. According to one example, each switching box in the first stage may be coupled to each switching box in the second stage.

In block 540, data may be sent from one of the two or more switches in a first switching box of one stage to at least one of the two or more switches in another switching box of another stage through a first of the two or more interconnects in the first switching box of the one stage and a second of the two or more interconnects in the another switching box of the another stage. For example, packets from a host device coupled to one of the first stage switching boxes may be transmitted from the left interconnect of the first stage switching box to a right interconnect of the second stage switching box. Downwards transmission of data from a higher stage switching box to a lower stage switching box may similarly occur.

The above-described aspects of the technology may be advantageous in providing a cost-efficient approach to building multi-stage networks. The disclosed subject matter has the benefit over a design using lower speed interconnects and one switch per PCB in that it has fewer cables, fewer PCBs, and leverages cheaper high capacity interconnect. Compared to a design using cheaper higher speed interconnects, it enables a flatter topology because it logically uses thinner pipes.

Although the present disclosure has been described with reference to particular examples, it should be understood that these examples are merely illustrative of the principles and applications of the disclosed subject matter. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made without departing from the spirit and scope of the subject matter as defined by the appended claims.

The invention claimed is:

1. A network, comprising:
 a first stage comprising a first plurality of switching boxes; and
 a second stage comprising a second plurality of switching boxes, wherein each switching box in the first stage is coupled to at least one switching box in the second stage;
 wherein each switching box of the first plurality of switching boxes and second plurality of switching boxes comprises:
  two or more switches; and
  two or more interconnects for coupling at least one external physical link to the switching box, each interconnect having at least one external connector capable of providing a physical connection to the at least one external physical link and a set of connectors, each connector of the set of connectors having an associated position among a plurality of positions on the respective interconnect, for connecting the interconnect to respective ports of the two or more switches of the switching box,
 wherein:
  a first interconnect of the at least two or more interconnects of the switching box includes a first set of connectors,
  a second interconnect of the at least two or more interconnects of the switching box includes a second set of connectors, and
  a connector in one position of the plurality of positions on the first interconnect connects the first interconnect to a first switch of the two or more switches of the switching box, and a connector in the same position on the second interconnect connects the second interconnect to a switch of the two or more switches of the switching box other than the first switch.

2. The network of claim 1, further comprising a third stage comprising at least one other switching box, wherein the at least one other switching box is connected to at least one of the second plurality of switching boxes.

3. The network of claim 1, further comprising a third stage comprising a spine, wherein the spine is connected to each of the second plurality of switching boxes.

4. The network of claim 1, wherein:
 a first one of the first plurality of switching boxes is coupled to a first one of the second plurality of switching boxes via one cable; and
 a second one of the first plurality of switching boxes is coupled to a second one of the second plurality of switching boxes via one cable.

5. The network of claim 1, wherein:
 the first interconnect of a first one of the first plurality of switching boxes is coupled to the second interconnect of a first one of the second plurality of switching boxes;
 the second interconnect of a second one of the first plurality of switching boxes is coupled to the first interconnect of a second one of the second plurality of switching boxes.

6. The network of claim 5, wherein:
 the second interconnect of the first one of the first plurality of switching boxes is coupled to a host device; and
 the first interconnect of the second one of the first plurality of switching boxes is coupled to another host device.

7. The network of claim 5, further comprising a third stage comprising at least one other switching box, wherein:
 the first interconnect of the first one of the second plurality of switching boxes is coupled to a second interconnect of the at least one other switching box; and
 the second interconnect of the second one of the second plurality of switching boxes is coupled to a first interconnect of the at least one other switching box.

8. The network of claim 4, wherein the cables are 40GE cables.

9. The network of claim 1, wherein each switching box of the first plurality of switching boxes and the second plurality of switching boxes comprises two switches and two interconnects.

10. The network of claim 1,
 wherein connectors in the first set of connectors connect the first interconnect to each of the switches in the switching box according to a first connection pattern, in which connectors on the interconnect strictly alternate between connecting the first interconnect to a first switch of the switching box and a second switch of the switching box; and wherein connectors in the second set of connectors connect the second interconnect to each of the switches in the switching box according to a second connection pattern in which connectors on the second interconnect alternate every two positions between connecting the second interconnect to a first switch of the switching box and a second switch of the switching box.

11. A switching box, comprising:

two or more switches; and two or more interconnects for coupling at least one external physical link to the switching box, each interconnect having at least one external connector capable of providing a physical connection to the at least one external physical link and a set of connectors, each connector of the set of connectors having an associated position among a plurality of positions on the respective interconnect, for connecting the interconnect to respective ports of the two or more switches of the switching box, wherein:
- a first interconnect of the at least two or more interconnects of the switching box includes a first set of connectors,
- a second interconnect of the at least two or more interconnects of the switching box includes a second set of connectors, and
- a connector in one position of the plurality of positions on the first interconnect connects the first interconnect to a first switch of the two or more switches of the switching box, and a connector in the same position on the second interconnect connects the second interconnect to a switch of the two or more switches of the switching box other than the first switch.

12. The switching box of claim 11, wherein connectors in the first set of connectors connect the first interconnect to each of the switches in the switching box according to a first connection pattern, in which connectors on the interconnect strictly alternate between connecting the first interconnect to a first switch of the switching box and a second switch of the switching box; and wherein connectors in the second set of connectors connect the second interconnect to each of the switches in the switching box according to a second connection pattern in which connectors on the second interconnect alternate every two positions between connecting the second interconnect to a first switch of the switching box and a second switch of the switching box.

13. The switching box of claim 11, wherein each of the two or more interconnects is adapted to be coupled to an external device.

14. The switching box of claim 13, wherein the external device comprises a networking component.

15. The switching box of claim 14, wherein the external device comprises a host.

16. The switching box of claim 14, wherein the external device comprises another switching box.

17. The switching box of claim 14, wherein a number of switches in the two or more switches is equal to a number of interconnects in the two or more interconnects.

18. The switching box of claim 11, wherein each of the two or more interconnects comprises a QSFP interconnect.

19. The switching box of claim 18, wherein each of the two or more interconnects is 16×40GE capable.

20. The switching box of claim 11, wherein each of the two or more interconnects comprises four connections.

21. The switching box of claim 19, wherein the four connections are each 10GE capable.

22. A network, comprising:

a first stage comprising a first plurality of switching boxes;

a second stage comprising a second plurality of switching boxes, wherein each switching box in the first stage is coupled to each switching box in the second stage;

wherein each switching box of the first plurality of switching boxes and the second plurality of switching boxes comprises two switches and two interconnects for coupling at least one external physical link to the switching box, each of the two or more interconnects having at least one external connector capable of providing a physical connection to the at least one external physical link and a set of at least four 10GE capable connectors, each of the at least four connectors having an associated position among a plurality of positions on the respective interconnect, for connecting the interconnect to respective ports of the two switches of the switching box, wherein
- a first interconnect of the two interconnects of the switching box includes a first set of connectors;
- a second interconnect of the two interconnects of the switching box includes a second set of connectors;
- a connector in one position of the plurality of positions on the first interconnect connects the first interconnect to a first switch of the two switches of the switching box, and a connector in the same position on the second interconnect connects the second interconnect to a switch of the two switches of the switching box other than the first switch;

wherein the first interconnect of a first one of the first plurality of switching boxes is coupled to the second interconnect of a first one of the second plurality of switching boxes via a 40GE cable; and wherein the second interconnect of a second one of the first plurality of switching boxes is coupled to the first interconnect of a second one of the second plurality of switching boxes via a 40GE cable.

23. A method of transmitting data through a network, comprising:

providing a first plurality of switching boxes in a first stage of the network;

providing a second plurality of switching boxes in a second stage of the network; wherein each switching box of the first plurality of switching boxes and second plurality of switching boxes comprises:

two or more switches; and two or more interconnects for coupling at least one external physical link to the switching box, each interconnect having at least one external connector capable of providing a physical connection to the at least one external physical link and a set of connectors, each of the connectors having an associated position among a plurality of positions on the respective interconnect, for connecting the interconnect to respective ports of the two or more switches of the switching box, wherein:

a first interconnect of the at least two or more interconnects of the switching box includes a first set of connectors;

a second interconnect of the at least two or more interconnects of the switching box includes a second set of connectors, and a connector in one position of the plurality of positions on the first interconnect connects the first interconnect to a first switch of the two or more switches of the switching box, and a connector in the same position on the second interconnect connects the second interconnect to a switch of the two or more switches of the switching box other than the first switch, coupling at least one of the two or more interconnects in each switching box in the first stage to at least one of the two or more interconnects in at least one switching box in the second stage; and sending data from one of the two or more switches in a first switching box of one stage to at least one of the two or more switches in another switching box of another stage through a first of the two or more interconnects in the first switching box of the one stage and a second of the two or more interconnects in the another switching box of the another stage.

* * * * *